United States Patent
Tosh et al.

(10) Patent No.: US 12,427,936 B2
(45) Date of Patent: Sep. 30, 2025

(54) QM ACTUATORS WITH AN ASIL-D DOMAIN CONTROLLER

(71) Applicant: Steering Solutions IP Holding Corporation, Saginaw, MI (US)

(72) Inventors: Owen K. Tosh, Saginaw, MI (US); William D. Bodeis, Midland, MI (US); Brendan Dziobak, Bay City, MI (US); Joshua D. Kirk, Frankenmuth, MI (US); Michael R. Story, Bay City, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 213 days.

(21) Appl. No.: 18/200,162

(22) Filed: May 22, 2023

(65) Prior Publication Data
US 2024/0391400 A1    Nov. 28, 2024

(51) Int. Cl.
*B60R 16/023* (2006.01)
*B60R 16/03* (2006.01)

(52) U.S. Cl.
CPC .......... *B60R 16/0231* (2013.01); *B60R 16/03* (2013.01)

(58) Field of Classification Search
CPC .................... B60R 16/0231; B60R 16/03
See application file for complete search history.

(56) References Cited

U.S. PATENT DOCUMENTS

| | | | |
|---|---|---|---|
| 7,366,677 B1 | 4/2008 | Liu et al. | |
| 11,552,798 B2 | 1/2023 | Sukhomlinov et al. | |
| 2015/0248115 A1* | 9/2015 | Colloton | G05B 19/0428 318/563 |
| 2017/0259763 A1* | 9/2017 | Chassard | H02J 7/34 |
| 2019/0092256 A1* | 3/2019 | Kim | B60R 16/033 |
| 2022/0128976 A1* | 4/2022 | Nixon | H04L 67/125 |
| 2022/0171611 A1* | 6/2022 | Goto | G06F 9/45558 |
| 2022/0242424 A1* | 8/2022 | Saenz | B60W 50/12 |
| 2023/0017962 A1* | 1/2023 | Huang | H04W 4/48 |

(Continued)

FOREIGN PATENT DOCUMENTS

| | | |
|---|---|---|
| CN | 113156916 A | 7/2021 |
| CN | 110901568 B | 11/2021 |

(Continued)

*Primary Examiner* — Abdalla A Khaled
(74) *Attorney, Agent, or Firm* — Dickinson Wright PLLC

(57) ABSTRACT

A method for controlling an actuator in a domain controller architecture in a vehicle includes receiving, at a domain controller, data related to operation of the actuator. The data includes information indicative of outputs of an actuator controller configured to control the actuator. The domain controller is configured to operate in accordance with a first safety integrity level among a plurality of safety integrity levels. The actuator controller is configured to operate in accordance with a second safety integrity level below the first safety integrity level. The method includes selectively supplying, from the domain controller based on the received data, a disable signal to a hardware component of the actuator controller to disable control of the actuator by the actuator controller. The disable signal is generated in accordance with the first safety integrity level and the hardware component is configured to operate in accordance with the first safety integrity level.

18 Claims, 4 Drawing Sheets

(56) References Cited

U.S. PATENT DOCUMENTS

| | | | |
|---|---|---|---|
| 2023/0019817 A1* | 1/2023 | Huang | H04L 67/12 |
| 2023/0049233 A1* | 2/2023 | Davidovich | G06F 9/44521 |
| 2023/0291336 A1* | 9/2023 | Horner | H03K 7/08 |
| 2023/0318511 A1* | 10/2023 | Cerutti | H02M 3/158 |
| | | | 318/445 |
| 2023/0406245 A1* | 12/2023 | Fuchs | H02J 1/086 |
| 2024/0010141 A1* | 1/2024 | Pflueger | B60R 16/023 |
| 2024/0132058 A1* | 4/2024 | Sugiyama | H04L 12/28 |
| 2024/0317161 A1* | 9/2024 | Vazquez | B60R 16/0238 |

FOREIGN PATENT DOCUMENTS

| | | |
|---|---|---|
| CN | 114675565 A | 6/2022 |
| CN | 115104097 A | 9/2022 |
| EP | 3869338 A1 | 8/2021 |
| WO | 2021152583 A1 | 8/2021 |
| WO | 2022199696 A1 | 9/2022 |

\* cited by examiner

QM ACTUATORS WITH AN ASIL-D DOMAIN CONTROLLER

TECHNICAL FIELD

This disclosure relates to controlling actuators in a vehicle, and more particularly to controlling actuators with a domain controller having a different safety integrity level than the actuators.

BACKGROUND OF THE INVENTION

A vehicle, such as a car, truck, sport utility vehicle, crossover, mini-van, marine craft, aircraft, all-terrain vehicle, recreational vehicle, or other suitable forms of transportation, typically includes a steering system, such as an electronic power steering (EPS) system, a steer-by-wire (SbW) steering system, a hydraulic steering system, or other suitable steering system. The steering system of such a vehicle typically controls various aspects of vehicle steering including providing steering assist to an operator of the vehicle, controlling steerable wheels of the vehicle, and the like.

Such a steering system may include a domain controller architecture, which may be used to control various actuators for engaging and/or actuating other components of the steering system.

SUMMARY OF THE INVENTION

This disclosure relates generally to systems and methods for controlling actuators of a vehicle in accordance with a desired safety integrity level.

An aspect of the disclosed embodiments includes a method for controlling an actuator in a domain controller architecture in a vehicle. The method includes receiving, at a domain controller, data related to operation of the actuator. The data includes information indicative of outputs of an actuator controller configured to control the actuator, the domain controller is configured to operate in accordance with a first safety integrity level among a plurality of safety integrity levels associated with the operation of the actuator, and the actuator controller is configured to operate in accordance with a second safety integrity level below the first safety integrity level. The method further includes selectively supplying, from the domain controller based on the received data, a disable signal to a hardware component of the actuator controller to disable control of the actuator by the actuator controller. The disable signal is generated in accordance with the first safety integrity level and the hardware component is configured to operate in accordance with the first safety integrity level.

In other aspects, the first safety integrity level corresponds to an automotive safety integrity level (ASIL)-D rating and the second safety integrity level corresponds to a quality management (QM) rating. The actuator controller is an electronic control unit (ECU) of a steering system of the vehicle. The steering system is configured to operate in accordance with the ASIL-D rating. Selectively supplying the disable signal includes comparing the received data to expected data corresponding to an expected response of the ECU caused by commands transmitted from the domain controller to the ECU and selectively supplying the disable signal based on the comparison. Supplying the disable signal includes supplying the disable signal via one or more wires coupling the domain controller to the hardware component and the one or more wires are separate from a vehicle network connection between the domain controller and the actuator controller.

In other aspects, the hardware component corresponds to one of a gate drive circuit of the actuator controller and a power supply of the actuator controller. The disable signal interrupts supply of power from the power supply to at least one of the gate drive circuit and the actuator controller. The actuator controller is a microcontroller configured to execute instructions stored in memory to control the actuator. The hardware component is a switching component responsive to the disable signal.

In other aspects, a system for controlling an actuator in a domain controller architecture of a vehicle includes a domain controller configured to operate in accordance with a first safety integrity level among a plurality of safety integrity levels associated with operation of the actuator and an actuator controller configured to control an actuator in response to commands received from the domain controller. The actuator controller is configured to operate in accordance with a second safety integrity level below the first safety integrity level. The domain controller is configured to receive, from the actuator controller, data related to operation of the actuator, wherein the data includes information indicative of outputs of the actuator controller, and selectively supply, based on the received data, a disable signal to a hardware component of the actuator controller to disable control of the actuator by the actuator controller. The disable signal is generated in accordance with the first safety integrity level and the hardware component is configured to operate in accordance with the first safety integrity level.

In other aspects, the first safety integrity level corresponds to an automotive safety integrity level (ASIL)-D rating and the second safety integrity level corresponds to a quality management (QM) rating. The actuator controller is an electronic control unit (ECU) of a steering system of the vehicle. The steering system is configured to operate in accordance with the ASIL-D rating. To selectively supply the disable signal, the domain controller is configured to compare the received data to expected data corresponding to an expected response of the ECU caused by commands transmitted from the domain controller to the ECU and selectively supply the disable signal based on the comparison. To supply the disable signal, the domain controller is configured to supply the disable signal via one or more wires coupling the domain controller to the hardware component, and wherein the one or more wires are separate from a vehicle network connection between the domain controller and the actuator controller.

In other aspects, the hardware component corresponds to one of a gate drive circuit of the actuator controller and a power supply of the actuator controller. The disable signal interrupts supply of power from the power supply to at least one of the gate drive circuit and the actuator controller. The actuator controller is a microcontroller configured to execute instructions stored in memory to control the actuator. The hardware component is a switching component responsive to the disable signal.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
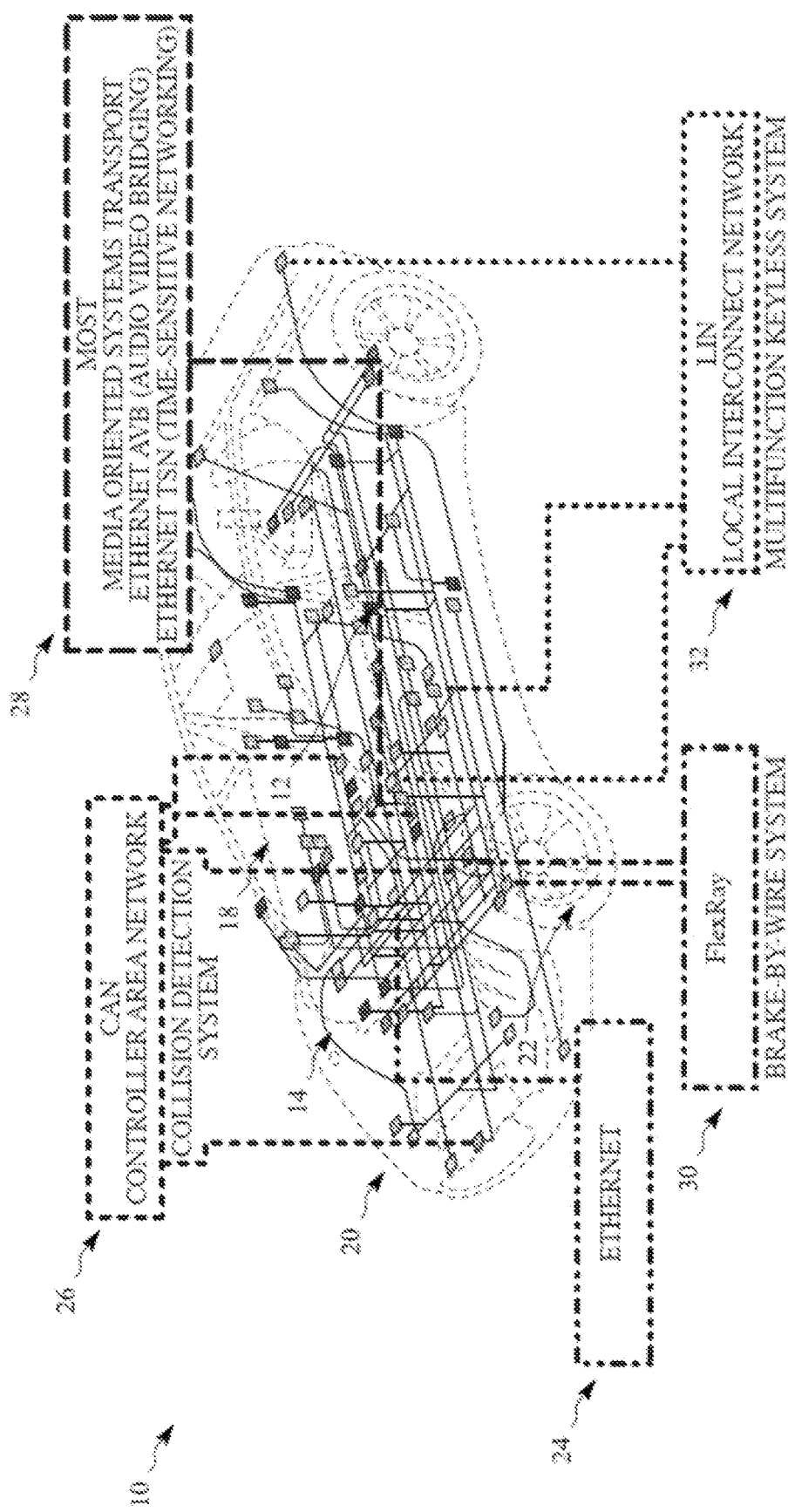
FIG. 1A generally illustrates an example vehicle according to the principles of the present disclosure.

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable forms of transportation, typically includes a steering system, such as an electronic power steering (EPS) system, a steer-by-wire (SbW) steering system, a hydraulic steering system, or other suitable steering system. The steering system of such a vehicle typically controls various aspects of vehicle steering including providing steering assist to an operator of the vehicle, controlling steerable wheels of the vehicle, and the like.

A steering system may include a domain controller architecture, which may be used to control various actuators for engaging and/or actuating other components of the steering system. Each domain controller may be configured to control functions of a specific area or domain of the vehicle. For example, a steering domain controller may be configured to control functions of the steering system, including controlling the various actuators.

Hardware and software vehicle components (including controllers, actuators, etc.) may be subject to various safety requirements, such as a required safety integrity level (e.g., an automotive safety integrity level, or ASIL). Different ASILs may be assigned to respective components (e.g., ASIL-A, B, C, or D, with ASIL-D corresponding to a highest safety rating/requirement).

Typically, steering system components are assigned the highest safety rating. While attaining the ASIL-D rating is costly for both hardware (e.g., redundancy) and labor (e.g., process redundancies), not every component of a system must individually be assigned the ASIL-D rating to qualify the system for the ASIL-D rating. In other words, some components of a system may have a lower safety rating. However, for domain controller architecture, control logic may be performed/implemented within a centralized controller and commands are transmitted to a group (i.e., domain) of actuators. Accordingly, the domain controller and every actuator having a safety-critical function (e.g., a steering function) must qualify for the ASIL-D rating.

In some examples, the ASIL-D rating can be attained using ASIL decomposition. "ASIL decomposition" refers to separating a complex system having a higher ASIL rating into multiple components having varying ASIL ratings to achieve the higher ASIL rating. For example, using decomposition, an ASIL-D rating can be attained using multiple components having ratings below ASIL-D.

Systems and methods according to the present disclosure are configured to implement decomposition (e.g., in a domain controller architecture) to attain a highest ASIL rating while including components having a lowest ASIL rating (e.g., a quality management (QM) rating). For example, for a steering system requiring an ASIL-D rating, a domain controller having the ASIL-D rating is configured to verify respective outputs of one or more components (electronic control units (ECUs), actuators, etc.) having a lower or lowest ASIL rating.

As one example, one or more ECUs and associated actuators responsive to a domain controller having the ASIL-D rating in a domain controller architecture have one or more components having the QM rating. As used herein, "ECU" may refer to a hardware module or assembly including one or more processors or microcontrollers, memory, sensors, one or more actuators, a communication interface, etc., any portions of which may be collectively referred to as "circuitry." The domain controller is configured to monitor outputs of the ECUs and selectively disable outputs of the ECUs and/or control of the actuators based on the monitored outputs independent of the control of the ECUs. In other words, the domain controller may be configured to function as a "kill switch" for ECUs within the corresponding domain.

In some examples, the domain controller is coupled to the respective ECUs (e.g., hardwired using one or more wires independent of a controller area network (CAN) or other vehicle network). In these examples, the domain controller is configured to transmit a disable signal to the ECU via the wire to selectively disable certain components (a gate drive circuit or controller, a power supply, etc.) of the ECU, control outputs of the ECU, etc. In some examples, the disable signal may be implemented as a "heartbeat" signal (e.g., a periodic signal including sequential pulses) and the components of the ECU may be responsive to whether the heartbeat signal is present. In other words, stopping or otherwise modifying the heartbeat signal may correspond to a disable command. In other embodiments, the domain controller may be configured to transmit the disable signal over the CAN or other vehicle network. In this manner, the domain controller is configured to monitor, verify operation of, and selectively disable the ECU.

As described herein, a hardware component of the ECU responsive to the disable signal has the highest (e.g., ASIL-D) rating. For example, a control component of an actuator (e.g., the gate drive circuit or controller) may have the highest ASIL rating. In other words, the domain controller and the component of the ECU that communicates directly with the domain controller to receive the disable signal each have the highest ASIL rating. Conversely, other components of the ECU (e.g., a processor, microcontroller, or related circuitry, memory, etc.) may have a lower ASIL rating, such as the QM rating, to reduce overall cost and complexity of the ECU.

FIG. 1A generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on a more rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a handwheel, and other such components are disposed in the passenger compartment 18 of the vehicle 10. The propulsion controls may be actuated or controlled by an operator of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semiautonomous vehicle, or other suitable type of vehicle. The vehicle 10 may include additional or fewer features than those generally illustrated and/or disclosed herein.

In some embodiments, the vehicle 10 may include an Ethernet component 24, a controller area network (CAN) bus 26, a media oriented systems transport component (MOST) 28, a FlexRay component 30 (e.g., brake-by-wire system, and the like), and a local interconnect network component (LIN) 32. The vehicle 10 may use the CAN bus 26, the MOST 28, the FlexRay Component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

In some embodiments, the vehicle 10 may include a steering system, such as an EPS system, a steering-by-wire steering system (e.g., which may include or communicate with one or more controllers that control components of the steering system without the use of mechanical connection between the handwheel and wheels 22 of the vehicle 10), a hydraulic steering system (e.g., which may include a magnetic actuator incorporated into a valve assembly of the hydraulic steering system), or other suitable steering system.

The steering system may include an open-loop feedback control system or mechanism, a closed-loop feedback control system or mechanism, or combination thereof. The steering system may be configured to receive various inputs, including, but not limited to, a handwheel position, an input torque, one or more roadwheel positions, other suitable inputs or information, or a combination thereof.

Additionally, or alternatively, the inputs may include a handwheel torque, a handwheel angle, a motor velocity, a vehicle speed, an estimated motor torque command, other suitable input, or a combination thereof. The steering system may be configured to provide steering function and/or control to the vehicle 10. For example, the steering system may generate an assist torque based on the various inputs. The steering system may be configured to selectively control a motor of the steering system using the assist torque to provide steering assist to the operator of the vehicle 10. In some examples, the steering system includes an EPS gear configured to provide steering assist functions. As used herein, "EPS gear" may refer to an EPS gear assembly including, for example, a motor, a gear reducer, and a controller or control circuitry.

The steering system may include and/or be responsive to one or more controllers (e.g., ECUs). For example, the vehicle 10 may implement a domain controller architecture including one or more domain controllers each configured to control a respective domain. For example, a domain may include one or more controllers or ECUs, actuators, etc. configured to control respective components of the domain, such as a steering system domain. The domain controller architecture (e.g., a domain controller and controllers/ECUs of the steering system of the vehicle 10) according to the present disclosure implements ASIL decomposition as described below in more detail.

Figure 1B:
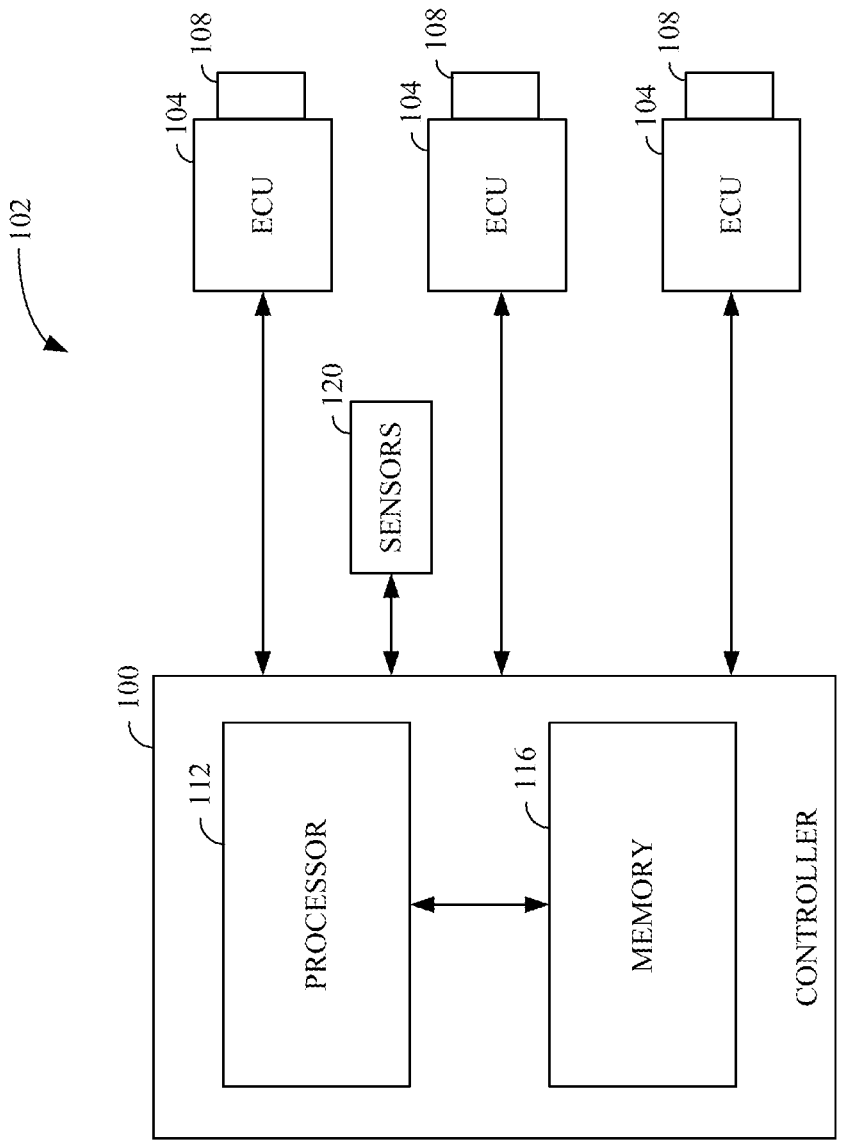
FIG. 1B generally illustrates an example controller according to the principles of the present disclosure.

The vehicle 10 includes one or more controllers, such as a controller 100, as is generally illustrated in FIG. 1B. The controller 100 may include or be implemented as any suitable controller, such as an electronic control unit or other suitable control circuitry. As described herein, the controller 100 may correspond to a domain controller of a domain 102 (e.g., a steering system domain) including a plurality of ECUs 104. For example, the controller 100 and ECUs 104 may correspond to controllers and actuators of a steering system of the vehicle 10. Each of the ECUs 104 may include and/or be associated with a respective actuator 108 or other control mechanism configured to actuate, control, provide torque to, etc. a component of the steering system.

The controller 100 and ECUs 104 may be configured to control, for example, the various functions of the steering system and/or various functions of the vehicle 10. The ECUs 104 may have a same or different configuration as the controller 100 as described below. For example, the controller 100 may include a processor 112 and a memory 116. The processor 112 may include any suitable processor, such as those described herein. Additionally, or alternatively, the controller 100 may include any suitable number of processors, in addition to or other than the processor 112. The memory 116 may comprise a single disk or a plurality of disks (e.g., hard drives), and includes a storage management module that manages one or more partitions within the memory 116. In some embodiments, the memory 116 may include flash memory, semiconductor (solid state) memory or the like. The memory 116 may include Random Access Memory (RAM), a Read-Only Memory (ROM), or a combination thereof. The memory 116 may include instructions that, when executed by the processor 112, cause the processor 112 to, at least, control various aspects of the vehicle 10. Additionally or alternatively, the memory 116 may include instructions that, when executed by the processor 112, cause the processor 112 to perform functions associated with the systems and methods described herein.

The controller 100 may receive one or more signals from various measurement devices or sensors 120 indicating sensed or measured characteristics of the vehicle 10. The sensors 120 may include any suitable sensors, measurement devices, and/or other suitable mechanisms. For example, the sensors 120 may include one or more torque sensors or devices, one or more handwheel position sensors or devices, one or more motor position sensor or devices, one or more position sensors or devices, other suitable sensors or devices, or a combination thereof. The one or more signals may indicate a handwheel torque, a handwheel angle, a motor velocity, a vehicle speed, other suitable information, or a combination thereof.

The controller 100 and the ECUs 104 according to the present disclosure implement ASIL decomposition such that the controller 100 has a highest ASIL rating (e.g., ASIL-D), the respective ECUs 104 have an ASIL rating lower than the highest ASIL rating, and the steering system/domain 102 has the highest ASIL rating. For example, the controller 100 is implemented as a domain controller configured to monitor outputs of the ECUs 104 and selectively disable the outputs and/or certain components of the ECUs such that the steering system itself attains the ASIL-D rating.

Figure 2:
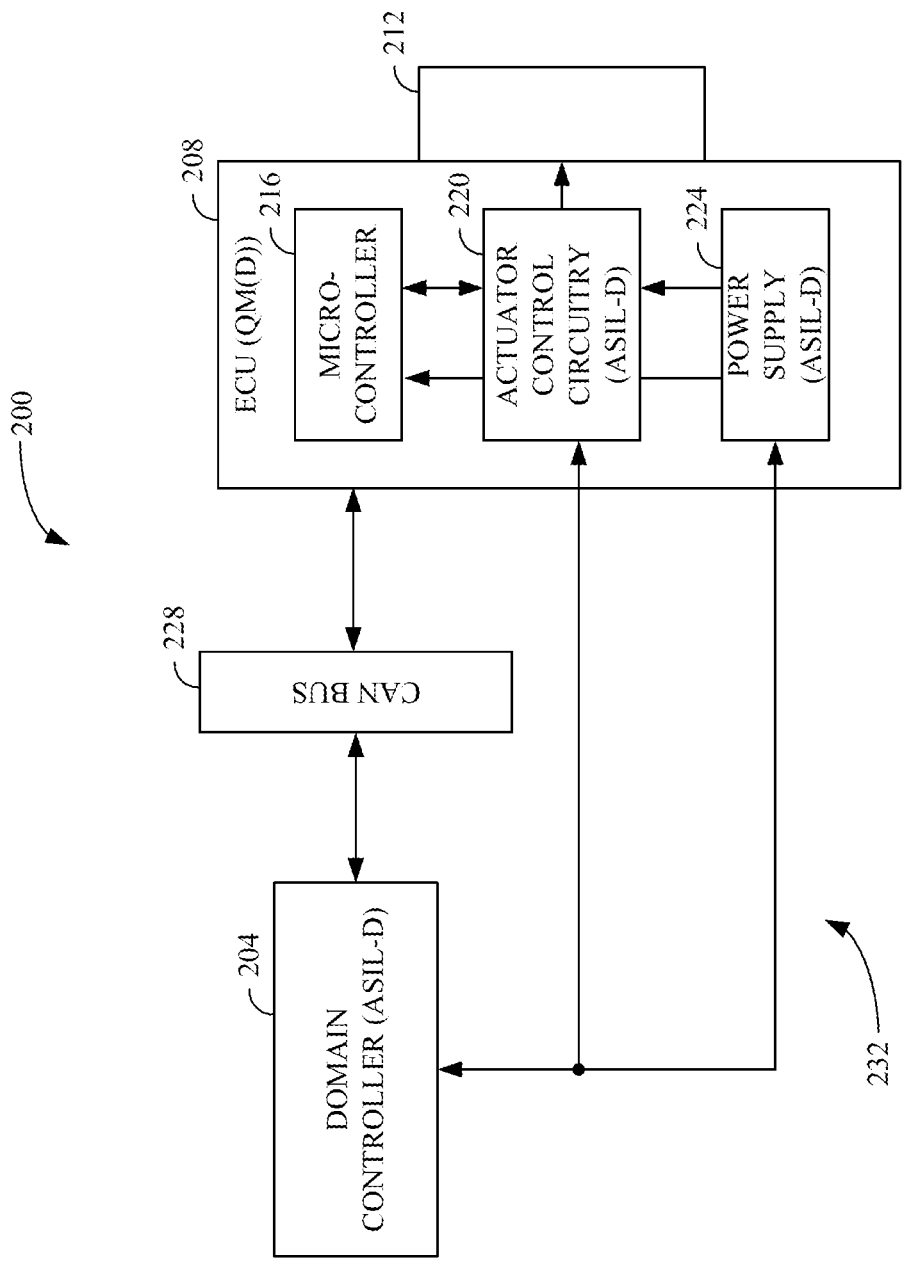
FIG. 2 generally illustrates a functional block diagram of an example domain controller and electronic control unit (ECU) according to the present disclosure.

FIG. 2 generally illustrates a functional block diagram of a system (e.g., a steering system) 200 including an example domain controller 204 and electronic control unit (ECU) 208 according to the present disclosure. Although shown as a single domain controller 204, respective functions of the domain controller 204 may be performed by one or more controllers (e.g., in a distributed manner). Although referred to as an ECU 208, the principles of the present disclosure may be implemented with any type of actuator controller or circuitry. The domain controller 204 has a highest ASIL rating (e.g., ASIL-D) and the ECU 208 has an ASIL rating lower than the highest ASIL rating (e.g., QM). The domain controller 204 is configured to monitor outputs of the ECU 208 and selectively disable the outputs and/or certain components of the ECU 208 such that the system 200 itself has the ASIL-D rating.

As shown, the ECU 208 is configured to control an actuator 212 of the system 200. For example, the ECU 208 includes a microcontroller 216 or other processing circuitry configured to generate outputs for controlling the actuator 212 using actuator control circuitry 220. As used herein, the actuator control circuitry 220 corresponds to control circuitry for the actuator 212, such as a gate drive circuit (e.g., a field effect transistor (FET) driver circuit) for a motor of the actuator 212. As one example, the actuator control circuitry 220 includes a transistor or other switching component configured to be responsive to commands received from the microcontroller 100 and selectively supply current to the actuator 212 (e.g., from a power supply 224) in response to the commands.

The domain controller 204 may communicate with the microcontroller 216 over a vehicle network, such as a CAN network and an associated CAN bus 228. For example, the domain controller 204 may transmit torque commands for the actuator 212. The microcontroller 216 may be configured to execute software (e.g., code stored in memory within the microcontroller 216 or elsewhere on the ECU 208) to output commands to the actuator control circuitry 220 based on the torque commands. Accordingly, for the system 200 to attain the ASIL-D rating, the microcontroller 216 (e.g., software executed by the microcontroller 216) is typically required to also have the ASIL-D rating. The ECU 208 according to the present disclosure is configured to include the microcontroller 216 and/or associated memory or software having an ASIL rating lower than ASIL-D (e.g., a QM rating) while still enabling the system 200 to attain the ASIL-D rating as described below in more detail.

For example, the domain controller 204 monitors and verifies outputs of the microcontroller 216 (e.g., outputs received via the CAN bus 228, from various sensors associated with the ECU 208 or other components of the system 200, etc.). As one example, the domain controller 204 compares the outputs of the microcontroller 216 with expected outputs (e.g., outputs expected in view of torque and/or other commands transmitted to the ECU 208, such as torque commands transmitted from the domain controller 204 to the microcontroller 216). As another example, the domain controller 204 is configured to implement fingerprinting techniques to determine whether outputs of the microcontroller 216 and/or other characteristics of the ECU 208 (e.g., operating temperatures, voltages, currents, etc.) are consistent (e.g., within a threshold variance) of expected outputs or characteristics of the ECU 208.

The domain controller 204 is configured to function as a "kill switch" to disable outputs of the ECU 208 (i.e., disable control of the actuator 212 by the ECU 208) in response to a determination that the outputs of the ECU 208 do not match expected outputs of the ECU 208. In other words, the domain controller 204 is configured to transmit a disable signal (or stop transmission of an enable signal, a heartbeat signal, etc.) to a hardware component of the ECU 208 to prevent control of the actuator 212 by the ECU 208. As used herein, "disable signal" refers to a signal configured to disable one or more components of the ECU or a signal required to enable operation of the one or more components (e.g., a heartbeat signal).

In some examples, the domain controller 204 is coupled (e.g., hardwired) to the actuator control circuitry 220, the power supply 224, and/or other hardware component or circuitry of the ECU 208 via one or more wires 232. For example, the actuator control circuitry 220, the power supply 224, etc. may include a disable pin or input configured to receive the disable signal. In other examples, the ECU 208, the actuator control circuitry 220, and/or the power supply 224 may be responsive to (or include components responsive to) commands received via the CAN bus 228. In these examples, a separate hardwired connection (i.e., the wires 232) between the domain controller 204 and the ECU 208 may be omitted. In any of these examples, the hardware component of the ECU 208 responsive to the disable signal has the ASIL-D rating. For example, the actuator control circuitry 220 and/or a transistor or switch of the actuator control circuitry 220 responsive to the domain controller 204 may have the ASIL-D rating.

In one example, the domain controller 204 transmits the disable signal to the actuator control circuitry 220. For example, the actuator control circuitry 220 includes a transistor or other switching component configured to uncouple the actuator control circuitry 220 from the power supply 224 (e.g., by opening the transistor or switching component), disable an output current of the actuator control circuitry 220, etc. In an example, the actuator control circuitry 220 corresponds to a gate drive circuit and the disable signal disables (i.e., turns off the gate drive circuit).

In another example, the domain controller 204 transmits the disable signal to the power supply 224 and the power supply 224 is configured to stop supplying power (e.g., current) to the actuator control circuitry 220 and/or the microcontroller 216 in response to receiving the disable signal.

In still other examples, the ECU 208 may include other components responsive to the disable signal, such as a second microcontroller or other hardware component independent of the microcontroller 216. For example, the second microcontroller may be configured to receive the disable signal (e.g., via the CAN bus 228 or a separate wired connection) and disable the actuator control circuitry 220, the power supply 224, etc. independently of the microcontroller 216.

In this manner, the domain controller 204 is configured to disable control of the actuator 212 by the ECU 212 independently of the control commanded by the microcontroller 216 (e.g., regardless of whether outputs of the microcontroller 216 attempt to control the actuator 212).

Figure 3:
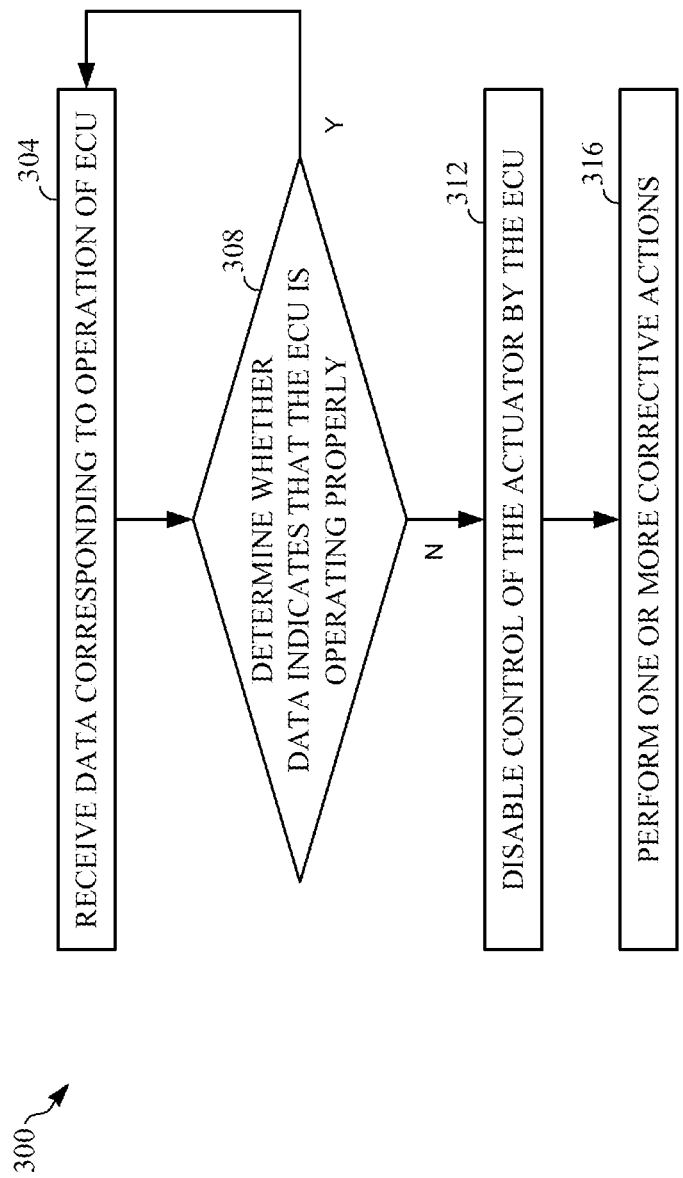
FIG. 3 generally illustrates an example method for operating a domain controller and ECU according to the present disclosure.

FIG. 3 generally illustrates an example method 300 for operating a domain controller and ECU according to the present disclosure. The respective steps of the method 300 may be implemented by the domain controller 204, the ECU 208, or other circuitry, individually or collectively. At 304, the method 300 (e.g., the domain controller 204) receives data corresponding to the operation of the ECU 208. For example, the received data may include, but is not limited to, data indicative of outputs of the microcontroller 212, outputs of the actuator control circuitry 220, outputs of the actuator 212 (e.g., a sensed output torque of the actuator 212), etc. The received data may be received via the CAN bus 228, directly from various sensors of the system 200, etc.

At 308, the method 308 (e.g., the domain controller 204) determines whether the received data indicates that the ECU 208 (e.g., the microcontroller 216 and/or associated memory, software, etc.) is operating properly. For example, the domain controller 204 compares the received data to expected data or outputs (e.g., outputs expected in view of torque and/or other commands transmitted to the ECU 208, such as torque commands transmitted from the domain controller 204 to the microcontroller 216). The received data not matching the expected data (e.g., values of the received data not being within a predetermined threshold of the expected data) may be indicative of an intrusion attempt or other failure of the ECU 208. If true, the method 300 proceeds to 304 and continues to monitor outputs of the ECU 208. If false, the method 300 proceeds to 312.

At 312, the method 308 (e.g., the domain controller 204) disables control of the actuator 212 of the ECU 208 by the ECU. For example, the domain controller 204 transmits a disable signal (or, causes an enable signal to stopping being transmitted) to one or more components of the ECU 208, such as the actuator control circuitry 220, the power supply 224, etc.

At 316, the method 308 (e.g., the domain controller 204) may perform one or more corrective actions. For example, the domain controller 204 may cause an alert or other information to be displayed (e.g., to the driver via a vehicle display or indicator), such as a recommendation that the driver pull over or turn off the vehicle, a recommendation to have the vehicle serviced, etc.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for controlling an actuator in a domain controller architecture in a vehicle, the method comprising:
    receiving, at a domain controller, data related to operation of the actuator, wherein the data includes information indicative of outputs of an actuator controller configured to control the actuator, wherein the domain controller is configured to operate in accordance with a first safety integrity level among a plurality of safety integrity levels associated with the operation of the actuator, wherein the actuator controller is configured to operate in accordance with a second safety integrity level below the first safety integrity level, and wherein the first safety integrity level corresponds to an automotive safety integrity level (ASIL)-D rating and the second safety integrity level corresponds to a quality management (QM) rating; and
    selectively supplying, from the domain controller based on the received data, a disable signal to a hardware component of the actuator controller to disable control of the actuator by the actuator controller, wherein the disable signal is generated in accordance with the first safety integrity level and the hardware component is configured to operate in accordance with the first safety integrity level.

2. The method of claim 1, wherein the actuator controller is an electronic control unit (ECU) of a steering system of the vehicle.

3. The method of claim 2, wherein the steering system is configured to operate in accordance with the ASIL-D rating.

4. The method of claim 3, wherein selectively supplying the disable signal includes (i) comparing the received data to expected data corresponding to an expected response of the ECU caused by commands transmitted from the domain controller to the ECU and (ii) selectively supplying the disable signal based on the comparison.

5. The method of claim 1, wherein supplying the disable signal includes supplying the disable signal via one or more wires coupling the domain controller to the hardware component, and wherein the one or more wires are separate from a vehicle network connection between the domain controller and the actuator controller.

6. The method of claim 1, wherein the hardware component corresponds to one of (i) a gate drive circuit of the actuator controller and (ii) a power supply of the actuator controller.

7. The method of claim 6, wherein the disable signal interrupts supply of power from the power supply to at least one of (i) the gate drive circuit and (ii) the actuator controller.

8. The method of claim 1, wherein the actuator controller is a microcontroller configured to execute instructions stored in memory to control the actuator.

9. The method of claim 1, wherein the hardware component is a switching component responsive to the disable signal.

10. A system for controlling an actuator in a domain controller architecture of a vehicle, the system comprising:
    a domain controller configured to operate in accordance with a first safety integrity level among a plurality of safety integrity levels associated with operation of the actuator; and
    an actuator controller configured to control an actuator in response to commands received from the domain controller, wherein the actuator controller is configured to operate in accordance with a second safety integrity level below the first safety integrity level, and wherein the first safety integrity level corresponds to an automotive safety integrity level (ASIL)-D rating and the second safety integrity level corresponds to a quality management (QM) rating,
    wherein the domain controller is configured to
        receive, from the actuator controller, data related to operation of the actuator, wherein the data includes information indicative of outputs of the actuator controller, and
        selectively supply, based on the received data, a disable signal to a hardware component of the actuator controller to disable control of the actuator by the actuator controller, wherein the disable signal is generated in accordance with the first safety integrity level and the hardware component is configured to operate in accordance with the first safety integrity level.

11. The system of claim 10, wherein the actuator controller is an electronic control unit (ECU) of a steering system of the vehicle.

12. The system of claim 11, wherein the steering system is configured to operate in accordance with the ASIL-D rating.

13. The system of claim 12, wherein, to selectively supply the disable signal, the domain controller is configured to (i) compare the received data to expected data corresponding to an expected response of the ECU caused by commands transmitted from the domain controller to the ECU and (ii) selectively supply the disable signal based on the comparison.

14. The system of claim 10, wherein, to supply the disable signal, the domain controller is configured to supply the disable signal via one or more wires coupling the domain controller to the hardware component, and wherein the one or more wires are separate from a vehicle network connection between the domain controller and the actuator controller.

15. The system of claim 10, wherein the hardware component corresponds to one of (i) a gate drive circuit of the actuator controller and (ii) a power supply of the actuator controller.

16. The system of claim 15, wherein the disable signal interrupts supply of power from the power supply to at least one of (i) the gate drive circuit and (ii) the actuator controller.

17. The system of claim 10, wherein the actuator controller is a microcontroller configured to execute instructions stored in memory to control the actuator.

18. The system of claim 10, wherein the hardware component is a switching component responsive to the disable signal.

* * * * *